US012775273B2

(12) United States Patent
Baltz et al.

(10) Patent No.: US 12,775,273 B2
(45) Date of Patent: Oct. 27, 2026

(54) AGRONOMY DATA UTILIZATION SYSTEM AND METHOD

(71) Applicant: DEERE & COMPANY, Moline, IL (US)

(72) Inventors: Nicholas C. Baltz, Port Byron, IL (US); Adam J. Royal, Urbandale, IA (US); Duane M. Bomleny, Geneseo, IL (US); Kent S. Brown, Sherrard, IL (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 632 days.

(21) Appl. No.: 17/977,714

(22) Filed: Oct. 31, 2022

(65) Prior Publication Data

US 2024/0142980 A1 May 2, 2024

(51) Int. Cl.
*G05D 1/00* (2006.01)
*A01B 79/02* (2006.01)

(52) U.S. Cl.
CPC ............. *G05D 1/021* (2013.01); *A01B 79/02* (2013.01)

(58) Field of Classification Search
CPC ................................ A01B 79/02; G05D 1/021
See application file for complete search history.

(56) References Cited

U.S. PATENT DOCUMENTS 7,739,861 B2 6/2010 Mackin
8,078,367 B2 12/2011 Sauder et al.
9,301,446 B2 4/2016 Peters
9,443,494 B1 * 9/2016 Parish ...................... G09G 5/14
9,668,420 B2 6/2017 Anderson et al.
9,696,162 B2 7/2017 Anderson
10,154,624 B2 12/2018 Guan et al.
10,755,367 B2 8/2020 Bones et al.
10,757,859 B2 9/2020 Dima et al.
10,881,045 B2 1/2021 Staples et al.
(Continued)

FOREIGN PATENT DOCUMENTS

CN 109197084 A 1/2019
CN 109197342 A 1/2019
(Continued)

OTHER PUBLICATIONS

"Prescription maps for nitrogen fertilization", Agricolus, Mar. 3, 2020; (https://www.agricolus.com/en/prescription-maps-for-nitrogen-fertilization/.
(Continued)

*Primary Examiner* — Oneal R Mistry
(74) *Attorney, Agent, or Firm* — Taft Stettinius & Hollister LLP; Stephen F. Rost

(57) ABSTRACT

Annotations for a map of a worksite are generated by a controller. The controller receives georeferenced crop state data and georeferenced agricultural characteristic data, collectively referred to as agronomy data. The georeferenced crop state data and georeferenced agricultural characteristic data are analyzed by the controller to determine relationships therebetween. The controller generates the annotations based on the determined relationships. The controller generates explanations, which are type of annotation, based on determined relationships between current agronomy data and historical agronomy data.

23 Claims, 11 Drawing Sheets

(56) References Cited

U.S. PATENT DOCUMENTS

| | | | | |
|---|---|---|---|---|
| 11,044,847 | B2 | 6/2021 | Fries et al. | |
| 11,175,157 | B1 * | 11/2021 | Elder | G01C 23/00 |
| 2014/0022223 | A1 | 1/2014 | Jung | |
| 2015/0305238 | A1 | 10/2015 | Klausmann et al. | |
| 2016/0239709 | A1 * | 8/2016 | Shriver | G06V 20/188 |
| 2017/0082442 | A1 | 3/2017 | Anderson | |
| 2018/0084708 | A1 | 3/2018 | Neitemeier et al. | |
| 2018/0314949 | A1 | 11/2018 | Bender et al. | |
| 2019/0163349 | A1 * | 5/2019 | Derner | G06F 3/005 |
| 2019/0307070 | A1 | 10/2019 | Dima et al. | |
| 2019/0327889 | A1 | 10/2019 | Borgstadt | |
| 2020/0068804 | A1 * | 3/2020 | Barther | G06T 7/74 |
| 2020/0084965 | A1 | 3/2020 | Neitemeier et al. | |
| 2021/0000006 | A1 * | 1/2021 | Ellaboudy | A01B 69/001 |
| 2021/0042858 | A1 | 2/2021 | Bones et al. | |
| 2021/0243936 | A1 | 8/2021 | Vandike et al. | |
| 2021/0243938 | A1 | 8/2021 | Blank et al. | |
| 2021/0243950 | A1 | 8/2021 | Blank et al. | |
| 2021/0289701 | A1 | 9/2021 | White et al. | |
| 2021/0350478 | A1 | 11/2021 | Ethington et al. | |
| 2021/0374161 | A1 | 12/2021 | Marvaniya et al. | |
| 2022/0167547 | A1 | 6/2022 | Vandike et al. | |
| 2022/0183208 | A1 * | 6/2022 | Sibley | A01B 69/001 |
| 2023/0046844 | A1 | 2/2023 | Anderson et al. | |
| 2023/0046882 | A1 | 2/2023 | Anderson et al. | |
| 2023/0048683 | A1 | 2/2023 | Hubner et al. | |

FOREIGN PATENT DOCUMENTS

| | | | |
|---|---|---|---|
| DE | 102016202628 | A1 | 8/2017 |
| DE | 102016118227 | A1 | 3/2018 |
| DE | 102016118237 | A1 | 3/2018 |
| DE | 102017129193 | A1 | 6/2019 |
| DE | 102019111089 | A1 | 11/2020 |
| EP | 2681984 | B1 | 1/2016 |
| EP | 3150055 | A1 | 4/2017 |
| EP | 3299995 | A1 | 3/2018 |
| EP | 3299996 | A1 | 3/2018 |
| EP | 3552474 | A1 | 10/2019 |
| WO | 2014093794 | A1 | 6/2014 |
| WO | 2014093814 | A1 | 6/2014 |

OTHER PUBLICATIONS

"How to Calculate Nitrogen Fertilizers for Variable-Rate Application", Onesoil; (https://blog.onesoil.ai/en/how-to-calculate-nitrogen-fertilizers-with-onesoil); Date Accessed: Mar. 11, 2022; pp. 1-6.

"Prescription Maps", Future Learn; (https://www.futurelearn.com/info/courses/innovation-in-arable-farming/0/steps/160453); pp. 1-5; Date Accessed: Mar. 11, 2022.

"On-Farm Evaluation of Prescription Map-Based Variable Rate Application of Pesticides in Vineyards", Agronomy; (https://www.mdpi.com/2073-4395/10/1/102/htm); pp. 1-22; Agronomy 2020.

"Protein Mapping Identifies Nitrogen Limited Zones Within the Field", CropLife, (https://www.croplife.com/crop-inputs/protein-mapping-identifies-nitrogen-limited-zones-within-the-field/); Date: Oct. 26, 2022; pp. 1-18.

"Pea Oat Intercrop has Potential", Canadian Agronomist, May 7, 2020 (https://canadianagronomist.ca/wp-content/uploads/2020/05/Pea-oat-intercrop-has-potential.pdf; pp. 1-4.

"Nitrogen Recommendations for Corn that Credit Cover Crops and Soil Organic Matter" (Nitrogen Recommendations for Corn that Credit Cover Crops and Soil Organic Matter (psu.edu)); PennState Extension; Date Accessed: Mar. 25, 2022; pp. 1-5.

"Fertilizing Corn in Minnesota" (Fertilizing Corn in Minnesota (extension.umn.edu)); University of Minnesota Extension; (https:/extension.umn.edu/crop-specific-needs/fertilizing-corn-minnesota); pp. 1-20; Accessed Date: Mar. 25, 2022.

"Fertilizing Corn in Minnesota"; (Nutrient Management); University of Minnesota Extension; Article: AGFO3790-D, Revised 2020; pp. 1-12.

"Nitrogen" (https://extension.umn.edu/nutrient-management/nitrogen); Regents of the University of Minnesota; University of Minnesota Extension; Accessed Date: Mar. 25, 2022; pp. 1-5.

"Graphical Interface to Determine Cover Crop and Soil Organic Matter N Credits" (Graphical Analysis Tool to Assess Tradeoffs Between N Supply and N Retention with Cover Crop Mixtures (psu.edu)); (https://extension.psu.edu/graphical-analysis-tool); PennState Extension; Accessed Date: Mar. 25, 2022 ; pp. 1-3.

"Strengths and Limitations of Nitrogen Rate Recommendations for Corn and Opportunities for Improvement" (Strengths and Limitations of Nitrogen Rate Recommendations for Com and Opportunities for Improvement (wiley.com)); Agronomy Journal, vol. 110, Issue I, 2018; Published: Dec. 14, 2017; pp. 1-37.

"Wheat Lodging Detection from UAS Imagery Using Machine Learning Algorithms," MDPI, Remote Sensing, Zhang et al., published Jun. 5, 2020, 19 pages.

* cited by examiner

402

System (Alert): "Lodging Magnitude Greater than 30 Degrees. Measured Harvest Yield is 25% Less than Non-Lodged Worksite Average."

User: "Tell Me More"

404

System (Explanation): "Remote Sensing Showed Highly Significant NDVI Reduction Two Weeks After August 10, 2022 Wind Event."

Fig. 4

AGRONOMY DATA UTILIZATION SYSTEM AND METHOD

FIELD OF THE DISCLOSURE

The present description relates to agricultural machines and agricultural operations and, in particular, to utilization of agronomy data with agricultural machines and agricultural operations.

BACKGROUND OF THE DISCLOSURE

There are a variety of different types of agricultural machines. Some agricultural machines include combine harvesters, sugar cane harvesters, cotton harvesters, self-propelled forage harvesters, and windrowers. During operation, agricultural machines may encounter lodged crop, which refers to plants with stalks that are bent or broken due to unfavorable weather, poor soil conditions, or other factors. Lodging is a displacement of crops from a vertical orientation. Lodging can be measured in various ways. Other agronomy data can also be obtained during operation of an agricultural machine or at other times.

SUMMARY

In an illustrative embodiment, a method of generating an annotation for a map of a worksite includes: receiving georeferenced crop state data for at least a portion of the worksite; receiving georeferenced agricultural characteristic data; analyzing received georeferenced crop state data and received georeferenced agricultural characteristic data to determine a relationship between the received georeferenced crop state data and the received georeferenced agricultural characteristic data; and generating a georeferenced annotation based on the determined relationship between the received georeferenced crop state data and the received georeferenced agricultural characteristic data.

In some embodiments, the method includes displaying the generated georeferenced annotation on a display. In some embodiments, the method include generating a map including at least a portion of the worksite based on at least one of the received georeferenced crop state data and the received georeferenced agricultural characteristic data; and displaying the generated map on the display simultaneously with displaying the generated georeferenced annotation on the display. In some embodiments, displaying the generated map on the display simultaneously with displaying the generated georeferenced annotation on the display includes overlaying the generated georeferenced annotation on the generated map.

In some embodiments, the georeferenced crop state data includes at least one of lodging direction, lodging magnitude, a lodging crop health metric, predicted harvest yield, and actual harvest yield. In some embodiments, the georeferenced crop state data includes at least one of lodging direction and lodging magnitude. In some embodiments, the georeferenced crop state data includes at least the lodging crop health metric.

In some embodiments, the georeferenced agricultural characteristic data includes at least one of topography, soil characteristics, crop characteristics, pest characteristics, management characteristics, and weather characteristics. In some embodiments, the georeferenced agricultural characteristic data includes wind data. In some embodiments, the georeferenced agricultural characteristic data includes lodging resistance of crop variety.

In some embodiments, the georeferenced agricultural characteristic data includes agricultural characteristic data for at least a portion of the worksite. In some embodiments, the georeferenced agricultural characteristic data includes agricultural characteristic data for an area outside the worksite.

In some embodiments, the georeferenced annotation includes at least one of an alert, an explanation, a prediction, a recommendation, and a prescription. In some embodiments, the georeferenced annotation includes at least a prediction. In some embodiments, the georeferenced annotation includes at least one of a recommendation and a prescription.

In another illustrative embodiment, a method of generating an annotation for a map of a worksite includes: receiving a first type of georeferenced crop state data for at least a portion of the worksite; receiving a second type of georeferenced crop state data for at least the portion of the worksite; analyzing the received first type of georeferenced crop state data and the received second type of georeferenced crop state data to determine a relationship between the received first type of georeferenced crop state data and the received second type of georeferenced crop state data; and generating a georeferenced annotation based on the determined relationship between the received first type of georeferenced crop state data and the received second type of georeferenced crop state data.

In some embodiments, the received first type of georeferenced crop state data includes at least one of lodging direction, lodging magnitude, and a lodging crop health metric, and the received second type of georeferenced crop state data includes at least one of predicted harvest yield and actual harvest yield. In some embodiments, the georeferenced annotation includes at least one of an alert, an explanation, a prediction, a recommendation, and a prescription.

In another illustrative embodiment, a method of generating an annotation for a map of a worksite includes: receiving georeferenced crop state data for at least a portion of the worksite; receiving georeferenced agricultural characteristic data; analyzing the received georeferenced crop state data and the received georeferenced agricultural characteristic data to determine a relationship between the georeferenced crop state data and the received georeferenced agricultural characteristic data; generating a georeferenced annotation based on the determined relationship between the received georeferenced crop state data and the received georeferenced agricultural characteristic data, the georeferenced annotation including at least one of an alert, an explanation, a prediction, a recommendation, and a prescription; generating a map including at least a portion of the worksite based on at least one of the received georeferenced crop state data and the received georeferenced agricultural characteristic data; displaying the map on the display; and displaying the georeferenced annotation on the display while displaying the map on the display.

In some embodiments, the georeferenced agricultural characteristic data includes at least one of topography, wind amplification, soil characteristics, crop characteristics, pest characteristics, management characteristics, and weather characteristics, and the georeferenced crop state data includes at least one of lodging direction, lodging magnitude, a lodging crop health metric, predicted harvest yield, and actual harvest yield.

In another illustrative embodiment, a method of generating an explanation for a map of a worksite includes: receiving georeferenced current agronomy data associated with the worksite; receiving georeferenced historical agronomy data; analyzing the received georeferenced current agronomy data and the received georeferenced historical agronomy data to determine a relationship between the received georeferenced current agronomy data and the received georeferenced historical agronomy data; identifying a region of interest based on the determined relationship between the received georeferenced current agronomy data and the received georeferenced historical agronomy data; and generating an explanation for the identification of the region of interest based on the determined relationship between the received georeferenced current agronomy data and the received georeferenced historical agronomy data.

In some embodiments, the method further includes displaying the generated explanation on a display. In some embodiments, the method further includes: generating a map including at least the region of interest; and displaying a generated map on the display simultaneously with displaying the generated explanation on the display.

In some embodiments, analyzing the received georeferenced current agronomy data and the received georeferenced historical agronomy data to determine a relationship between the received georeferenced current agronomy data and the received georeferenced historical agronomy data includes: determining whether the received georeferenced current agronomy data are outside an acceptable range for agronomy data, wherein the acceptable range for agronomy data is determined based on the received georeferenced historical agronomy data.

In some embodiments, identifying a region of interest based on the determined relationship between the received georeferenced current agronomy data and the received georeferenced historical agronomy data includes: identifying as the region of interest a portion of the worksite for which received georeferenced current agronomy data are outside an acceptable range for agronomy data, wherein the acceptable range for agronomy data is determined based on the received georeferenced historical agronomy data.

In some embodiments, the received georeferenced current agronomy data are agricultural characteristic data, and the received georeferenced historical agronomy data are agricultural characteristic data. In some embodiments, the received georeferenced current agronomy data includes a lodging crop health metric. In some embodiments, the received georeferenced historical agronomy data includes at least one of topography, crop characteristics, and weather characteristics.

In some embodiments, the received georeferenced historical agronomy data includes pest characteristics. In some embodiments, the received georeferenced current agronomy data includes pest characteristics. In some embodiments, the received georeferenced historical agronomy data includes agricultural characteristic data for at least a portion of the worksite. In some embodiments, the received georeferenced historical agronomy data includes agricultural characteristic data for an area outside the worksite.

In another illustrative embodiment, a method of generating an explanation for a map of a worksite includes: receiving georeferenced current agronomy data from the worksite; analyzing the received georeferenced current agronomy data and a predetermined value for agronomy data to determine a relationship between the received georeferenced current agronomy data and the predetermined value for agronomy data; identifying a region of interest based on at least the received georeferenced current agronomy data; and generating an explanation for the identification of the region of interest based on the determined relationship between the received georeferenced current agronomy data and the predetermined value for agronomy data.

In some embodiments, the method further includes displaying the explanation on a display. In some embodiments, the method further includes: generating a map including at least the region of interest; and displaying the map on the display simultaneously with displaying the explanation on the display.

In some embodiments, analyzing the received georeferenced current agronomy data and the predetermined value for agronomy data to determine a relationship between the received georeferenced current agronomy data and the predetermined value for agronomy data includes: determining whether the received georeferenced current agronomy data are outside an acceptable range for agronomy data, wherein the acceptable range for agronomy data is determined based on the predetermined value for agronomy data.

In some embodiments, identifying a region of interest based on at least the received georeferenced current agronomy data includes: identifying as the region of interest a portion of the worksite for which the received georeferenced current agronomy data are outside an acceptable range for agronomy data, wherein the acceptable range for agronomy data is determined based on the predetermined value for agronomy data.

In another illustrative embodiment, a method of generating an explanation for a map of a worksite includes: receiving georeferenced current agronomy data associated with the worksite; analyzing the received georeferenced current agronomy data and georeferenced historical agronomy data to determine a relationship between the received georeferenced current agronomy data and the georeferenced historical agronomy data; identifying a region of interest based on at least the received georeferenced current agronomy data; and generating an explanation for the identification of the region of interest based on the determined relationship between the received georeferenced current agronomy data and the georeferenced historical agronomy data.

In some embodiments, identifying a region of interest based on at least the received georeferenced current agronomy data includes: identifying as the region of interest a portion of the worksite for which received georeferenced current agronomy data are outside an acceptable range for agronomy data, wherein the acceptable range for agronomy data is determined based on the georeferenced historical agronomy data.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 4 is an example of speech annotations including an alert and an explanation;

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
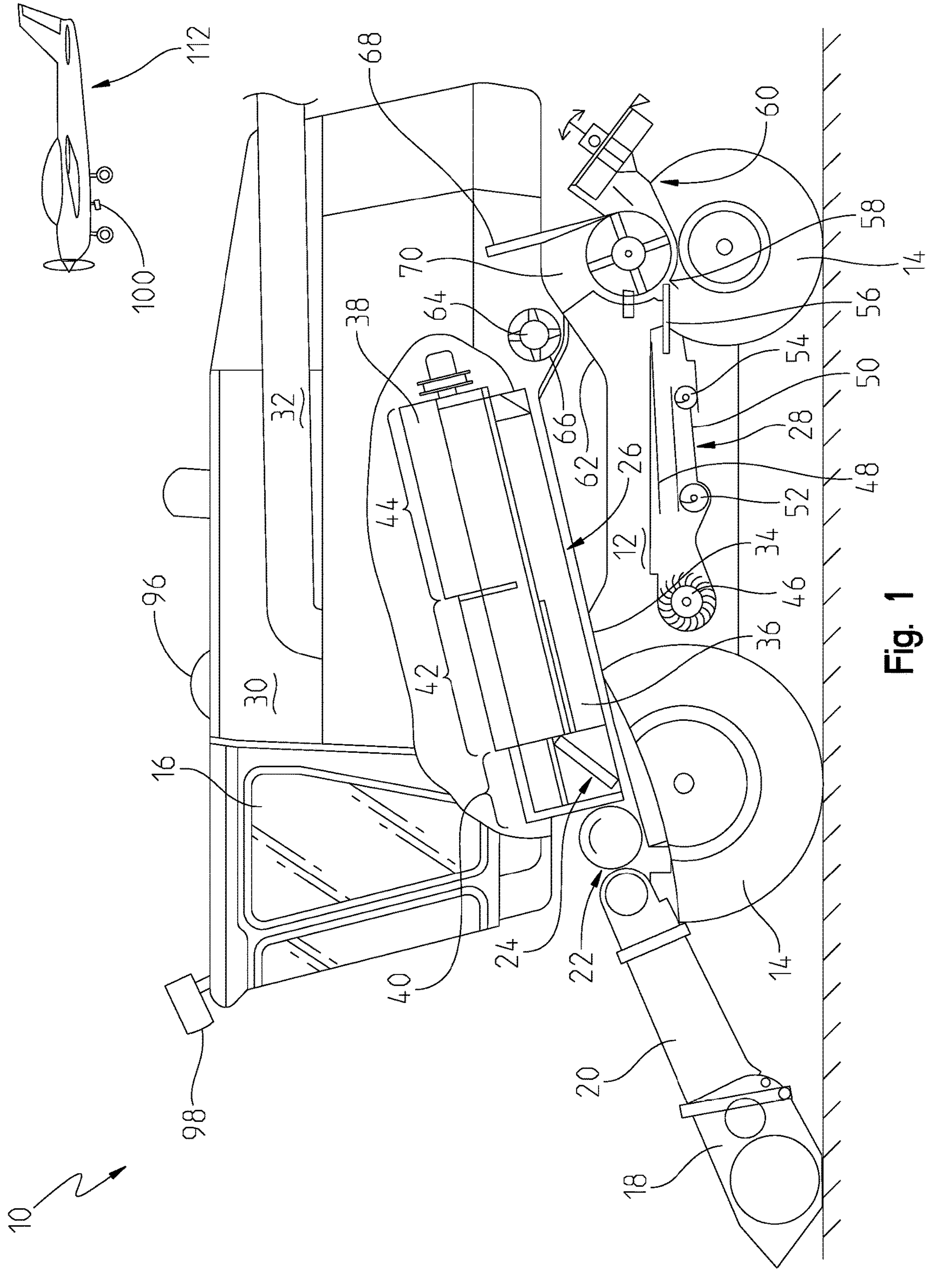
FIG. 1 is a side view of an example agricultural machine configured to harvest and process crop.

In FIG. 1, an embodiment of an agricultural machine 10 is shown. The agricultural machine 10 includes a frame 12 and one or more ground engaging mechanism, such as wheels 14 or tracks, that are in contact with an underlying ground surface. In the illustrative embodiment, the wheels 14 are coupled to the frame 12 and are used for propulsion of the agricultural machine 10 in a forward operating direction, which is to the left in FIG. 1, and in other directions. In some embodiments, operation of the agricultural machine 10 is controlled from an operator's cab 16. The operator's cab 16 may include any number of controls for controlling the operation of the agricultural machine 10, such as a user interface. In some embodiments, operation of the agricultural machine 10 may be conducted by a human operator in the operator's cab 16, a remote human operator, or an automated system.

A cutting head 18 is disposed at a forward end of the agricultural machine 10 and is used to harvest crop (such as corn) and to conduct the harvested crop to a slope conveyor 20. The harvested crop is conducted by a guide drum 22 from the slope conveyor 20. The guide drum 22 guides the harvested crop through an inlet side 24 to a threshing assembly 26, as shown in FIG. 1. The threshing assembly 26 includes one or more rotor assemblies 36. The rotor assembly 36 includes a hollow drum 38 for a charging section 40, a threshing section 42, and a separating section 44. The charging section 40 is arranged at a front end of the threshing assembly 26. The threshing section 42 and the separating section 44 are located adjacent to a rear of the charging section 40. The threshing section 42 may include a forward section in the form of a truncated cone and a cylindrical rear section.

Grain (such as corn), chaff, and the like that fall through a thresher basket associated with the threshing section 42 and through a separating grate associated with the separating section 44 may be directed to a clean crop routing assembly 28 with a blower 46 and sieves 48, 50 with louvers. The sieves 48, 50 can be oscillated in a fore-and-aft direction. The clean crop routing assembly 28 removes the chaff and guides clean grain over a screw conveyor 52 to an elevator for clean grain. The elevator for clean grain deposits the clean grain in a grain tank 30, as shown in FIG. 1. The clean grain in the grain tank 30 can be unloaded by means of an unloading screw conveyor 32 to a grain wagon, trailer, or truck. Harvested crop remaining at the lower end of the lower sieve 50 is again transported to the threshing assembly 26 by a screw conveyor 54. The harvested crop residue delivered at the upper end of the upper sieve 48 that consists essentially of chaff and small straw particles may be conveyed by means of an oscillating sheet conveyor 56 to a lower inlet 58 of a crop debris routing assembly 60.

The aforementioned blower 46 produces an air flow that carries much of the harvested crop residue to the rear of the agricultural machine 10 and to the crop debris routing assembly 60. The blower 46 is capable of providing three or more air paths inside the agricultural machine 10. A first air path may be through a front portion of the agricultural machine 10. A second air path may be above the lower sieve 50 and below the upper sieve 48. A third air path may be below the lower sieve 50. The air paths can create pressurized air flow to pick up and carry harvested crop residue to the rear of the agricultural machine 10.

Threshed-out straw leaving the separating section 44 is ejected through an outlet 62 from the threshing assembly 26 and conducted to an ejection drum 64. The ejection drum 64 interacts with a sheet 66 arranged underneath the ejection drum 64 to eject straw rearwardly. Grain and other material is directed through the clean crop routing assembly 28. A wall 68 is located to the rear of the ejection drum 64. The wall 68 guides straw into an upper inlet 70 of the crop debris routing assembly 60. Harvested crop residue moves through the crop debris routing assembly 60 for optional subsequent processing and ejection from the agricultural machine 10.

The agricultural machine 10 includes a plurality of sensors. For example, in the illustrative embodiment, the agricultural machine 10 includes a geographic position sensor 96 that illustratively detects the geographic location of the agricultural machine 10. The geographic position sensor 96 can include, but is not limited to, a global navigation satellite system (GNSS) receiver that receives signals from a GNSS satellite transmitter. The geographic position sensor 96 can also include a real-time kinematic (RTK) component that is configured to enhance the precision of position data derived from the GNSS signal. The geographic position sensor 96 can include a dead reckoning system, a cellular triangulation system, or any of a variety of other geographic position sensing components. In some embodiments, the geographic position sensor 96 may be positioned at other locations on the agricultural machine 10.

As suggested by FIG. 1, in one example, the agricultural machine 10 includes an in-situ sensor 98. What is meant by in-situ is that the sensor 98 detects information during the course of an agricultural operation. As shown in FIG. 1, in one example, the in-situ sensor 98 is an on-board sensor positioned on the agricultural machine 10. In some examples, the in-situ sensor 98 may be a remote sensor positioned away from the agricultural machine 10. In one example, the in-situ sensor 98 is a forward looking image capture mechanism, which may be in the form of a stereo or mono camera. In other embodiments, the in-situ sensor 98 may be positioned at a different location on the agricultural machine 10, angled at a different orientation, facing a different direction, or a combination of these. In some embodiments, the in-situ sensor 98 may include multiple sensors cooperating to detect information.

In one example, the in-situ sensor 98 captures one or more images of plants to collect crop state data. Crop state data include, for example, crop lodging direction, lodging magnitude, a lodging crop health metric, predicted harvest yield, and actual harvest yield. In one example, the in-situ sensor 98 includes a range scanning device, such as, but not limited to radar, LIDAR or sonar. A range scanning device can be used to sense the height of the crop, for example, which may be indicative of crop state.

In one example, the in-situ sensor 98 captures one or more images of plants or other aspects of a worksite to collect agricultural characteristic data. Agricultural characteristic data include any data regarding plants or other aspects of one or more worksites excluding crop state data. Examples of crop state data and agricultural characteristic data are provided herein.

It should be appreciated that the embodiment of FIG. 1 is merely a non-exclusive example of an agricultural machine 10 within the scope of the present disclosure. The teachings of this disclosure are not limited to the agricultural machine 10 shown and described in the context of FIG. 1. Rather, the teachings of this disclosure may be applied to any type of agricultural machine that measures, analyzes, utilizes, or otherwise interacts with crop state data, agricultural characteristic data, or both.

This disclosure describes systems and methods for utilization of crop state data, agricultural characteristic data, or both to generate annotations. Thus, crop state data, agricultural characteristic data, and annotations are described and exemplified herein. As used herein, the term agronomy data includes crop state data and agricultural characteristic data. Additional components that utilize agronomy data to generate annotations are described prior to further descriptions and examples of crop state data, agricultural characteristic data, and annotations.

Figure 2:
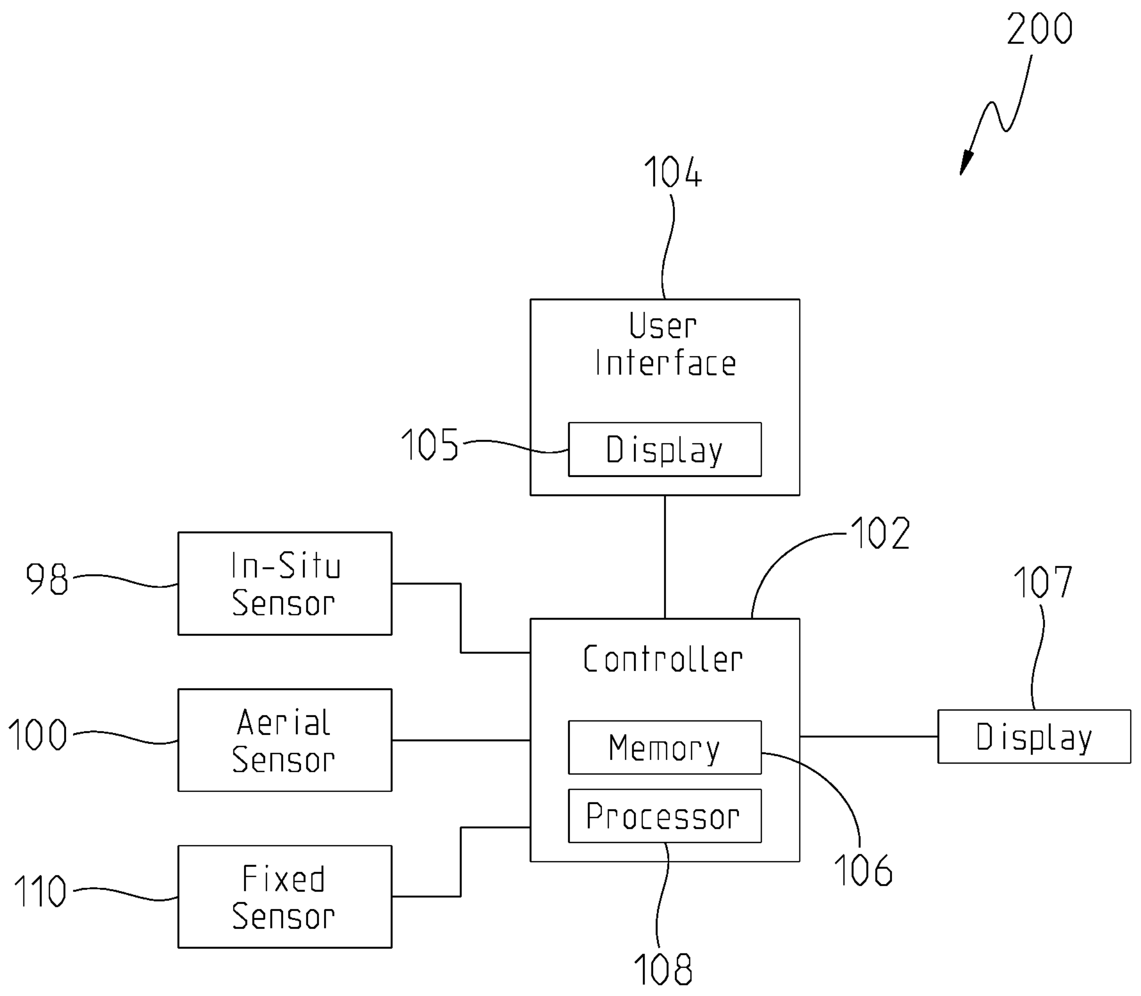
FIG. 2 is a diagrammatic view of an example control system configured to measure and analyze agronomy data that is usable with the agricultural machine of FIG. 2.

Referring now to FIG. 2, an example control system 200 is shown. The control system 200 includes a controller 102 and further includes the-situ sensor 98, an aerial sensor 100 (described below), and a fixed sensor 110 (described below), each of which are operatively coupled to the controller 102. The control system 200 also includes a user interface 104 operatively coupled to the controller 102. The user interface 104 is configured to send signals to the controller 102 indicative of information supplied to the user interface 104 by a user. In some embodiments, the user interface 104 includes a speaker and a microphone. In some embodiments, the user interface 104 may include one or more displays 105. In some embodiments, the controller 102 may be operatively coupled to one or more separate displays 107 that are separate from the user interface 104. The control system 200 includes one or more memories 106 included on or accessible by the controller 102 and one or more processors 108 included on or accessible by the controller 102. The one or more processors 108 are configured to execute instructions (e.g., one or more algorithms) stored on the one or more memories 106. The controller 102 may be a single controller or a plurality of controllers operatively coupled to one another. The controller 102 may be positioned on the agricultural machine 10 or positioned remotely, away from the agricultural machine 10. The controller 102 may be coupled via a wired connection or wirelessly to other components of the agricultural machine 10 and to one or more remote devices. In some instances, the controller 102 may be connected wirelessly via Wi-Fi, Bluetooth, Near Field Communication, or another wireless communication protocol to other components of the agricultural machine 10 and to one or more remote devices. In some embodiments, the controller 102 is configured to analyze crop state data and agricultural characteristic data to generate annotations, as described below.

Crop state data are received by the controller 102 and stored on the one or more memories 106. In some embodiments, the crop state data may be measured directly or received from a database without further processing. In other embodiments, neural networks and other automated intelligence (AI) processing may be used to analyze crop state data. For example, an image of one or more plants may be analyzed by the controller 102 with respect to training data sets that are formed from prior images. In other embodiments, various models may be used by the controller 102 to analyze crop state data.

As mentioned, crop state data include crop lodging direction, lodging magnitude, a lodging crop health metric, predicted harvest yield, and actual harvest yield. Lodging direction is the direction in which a standing crop is leaning or oriented. In some examples, the lodging direction may indicate that crop is not lodged. Some orientations can be relative to the agricultural machine 10, such as, but not limited to towards the agricultural machine 10, away from the agricultural machine 10, or other orientations relative to the agricultural machine 10. Some orientations can be absolute (e.g., relative to the earth) such as a numerical compass heading or numeric deviation from gravimetric or surface vertical in degrees. Thus, in some instances, the orientation may be provided as a heading relative to magnetic north, relative to true north, relative to a crop row, and relative to an agricultural machine heading. Lodging magnitude is the deviation of standing crop from a vertical reference. In some examples, the lodging magnitude may indicate that crop is not lodged. It should be appreciated that crop height, while indicative of other things, can also indicate an instance of lodging, lodging magnitude, lodging direction, or a combination of these.

A lodging crop health metric includes one or more values indicative of crop health. In some examples, the lodging crop health metric may indicate that crop is not lodged. One example of a lodging crop health metric is vegetative index data. In one example, vegetative index data may change, for example, due to nutrients being cut off by stalks or stems bending or breaking or plants uprooting. In other examples, the vegetative index data may change, for example, due to moisture levels or soil nutrient levels. One example of a vegetative index is a normalized difference vegetation index (NDVI). There are many other vegetative indices, and NDVI and other vegetative indices are within the scope of the present disclosure. In some examples, a vegetative index may be derived from one or more bands of sensed electromagnetic radiation reflected by plants. Without limitation, these bands may be in the microwave, infrared, visible, or ultraviolet portions of the electromagnetic spectrum. In some embodiments, the lodging heath crop metric may be a vegetative index map that maps vegetative index values across different geographic locations in one or more worksites of interest. The mapped vegetative index values may be indicative of vegetative growth. A worksite may include a single field, an area less than a single field, a collection of whole or partial fields, or any other geographic region or regions of interest. In some embodiments, predicted harvest yield data may be derived at least in part from NDVI data.

Crop state data may be measured by a variety of different devices. In one example, the in-situ sensor 98 measures crop state data as described above. In some embodiments, as shown in FIG. 1, an aerial machine 112 having the aerial sensor 100 may be used to obtain crop state data during a harvest operation or at another time, such as prior to a harvesting operation. In one example, the aerial sensor 100 is an image capture mechanism, which may be in the form of a stereo or mono camera. In one example, as shown in FIG. 1, the aerial machine 112 is a manned aerial vehicle. In other examples, the aerial machine 112 may be, for example, an unmanned aircraft, one or more balloons, or a satellite. In some embodiments, the aerial sensor 100 may include multiple sensors cooperating to obtain data measurements. In some embodiments, the aerial sensor 100 may include a range scanning device, such as, but not limited to radar, LIDAR or sonar. In some embodiments, the fixed sensor 110 may be used to measure crop state data. In one example, the fixed sensor 110 is an image capture mechanism, which may be in the form of a stereo or mono camera. In some embodiments, the fixed sensor 110 may include multiple sensors cooperating to obtain data measurements.

Agricultural characteristic data are received by the controller 102, stored on the one or more memories 106, or both. The agricultural characteristic data includes one or more of the following: topography; wind amplification data (e.g., based on topography and landscape); soil characteristics, such as type, structure, nutrients make-up, and moisture level; crop characteristics, such as species, variety, hybridization (which may include corresponding attributes such as lodging resistance and head-to-stem ratio), planting population, emergence population, stand population, planting direction, planting pattern, planting/seed location, and growth stage; pest characteristics such as pest type (including fungi, bacterium, plant (e.g., weed), insect, and animal), pest species, pest population, pest location, and pest size; management characteristics, such as tillage, harvesting direction, chemical treatment such as pesticide, fertilizer, and weed treatment; and weather characteristics, such as precipitation, wind data, and temperature.

Agricultural characteristic data may be measured by a variety of different devices. In one example, the in-situ sensor 98 measures agricultural characteristic data as described above. In some embodiments, the aerial sensor 100 of the aerial machine 112 may measure agricultural characteristic data. In some embodiments, the fixed sensor 110 may measure agricultural characteristic data. In some embodiments, the agricultural characteristic data may be measured directly or received from a database without further processing. In other embodiments, neural networks and other AI processing may be used to analyze agricultural characteristic data. For example, an image of one or more plants or other aspects of a worksite may be analyzed by the controller 102 with respect to training data sets that are formed from prior images to analyze the agricultural characteristic data. In other embodiments, various models may be used by the controller 102 to analyze the agricultural characteristic data.

In some embodiments, the crop state data, the agricultural characteristic data, or both may be georeferenced (i.e., referenced to a geographic position). For example, the geographic position sensor 96 of the agricultural machine 10 or another geographic position sensor may provide location information associated with the crop characteristic data, the agricultural characteristic data, or both. In some embodiments, crop state data, agricultural characteristic data, or both received by the controller 102, stored on the one or more memories 106, or both may include, for example, data from a worksite; a portion of a worksite; a plurality or worksites having one or more owners, lessees, or other users thereof, such as a governmental unit (e.g., a township, county, watershed, administrative district, state, or country). In some embodiments, crop characteristic data, agricultural characteristic data, or both received by the controller 102 may be analyzed in view of other crop characteristic data, agricultural characteristic data, or both pertaining to worksites that also contribute crop characteristic data, agricultural characteristic data, or both. In some embodiments, crop characteristic data, agricultural characteristic data, or both may be anonymized such that the worksite or owner, lessee, or other user of the worksite to which the crop characteristic data, agricultural characteristic data, or both pertains is unidentifiable.

In addition to being georeferenced, crop state data and agricultural characteristic data may be time-referenced. As described above, crop state data and agricultural characteristic data may be referred to collectively as agronomy data. Crop state data may be referred to as current agronomy data if such data are measured during an agricultural operation or during a crop's current growing season. Crop state data may be referred to as historical agronomy data if such data are measured at a time prior to a crop's current growing season. Agricultural characteristic data may be referred to as current agronomy data if such data are measured during an agricultural operation. Agricultural characteristic data may be referred to as historical agronomy data if such data are measured at a time prior to an agricultural operation or at a time prior to a crop's current growing season.

Figure 3:
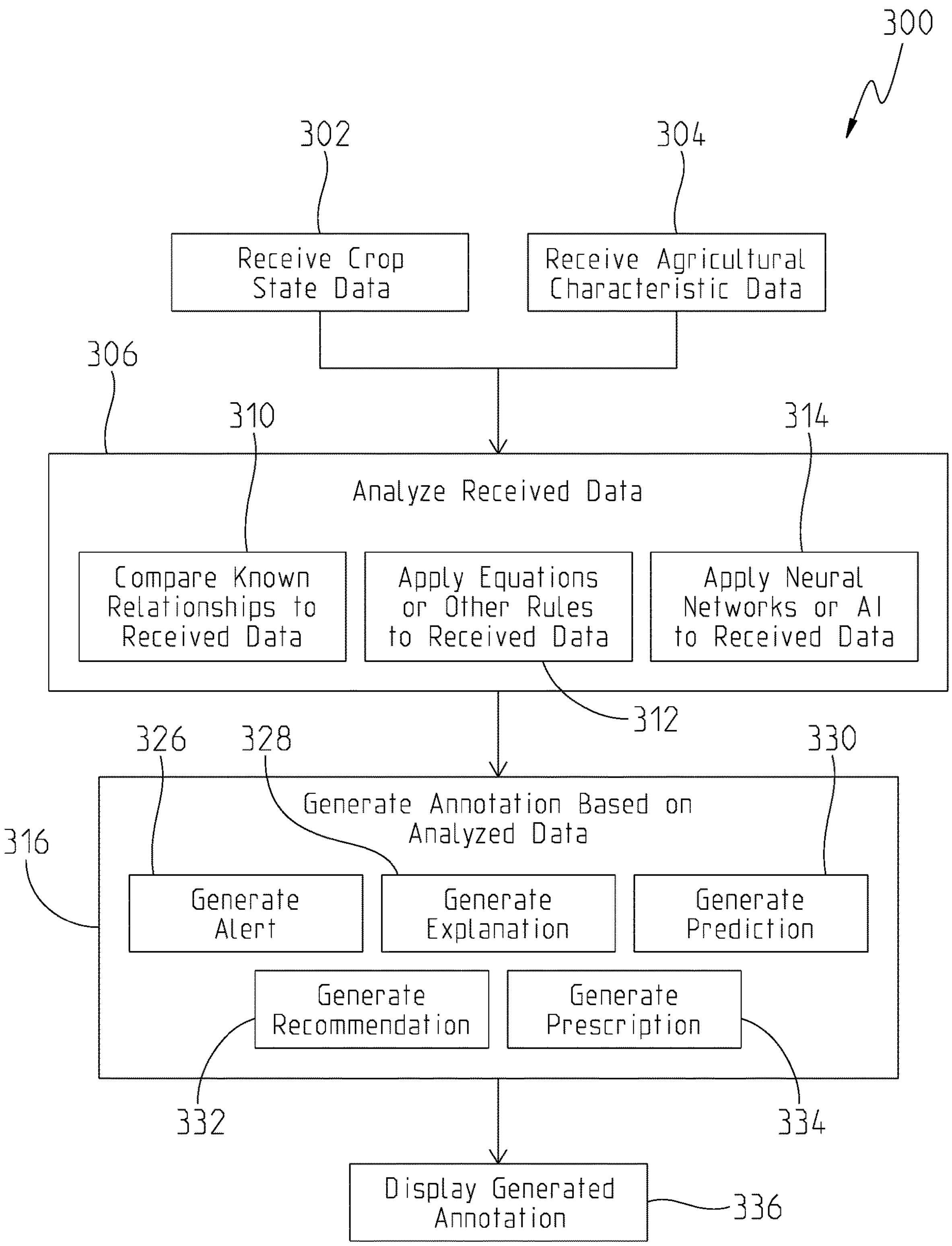
FIG. 3 is a flow diagram showing an example method of generating an annotation for a map of a worksite using agronomy data.

In FIG. 3, a method 300 for generating an annotation based on crop state data and agricultural characteristic data is shown. At 302, the controller 102 receives crop state data. At 304, the controller 102 receives agricultural characteristic data. At 306, the controller 102 analyzes the crop state data and agricultural characteristic data, for example, to determine at least one of a causation relationship, correlation relationship, or other relationship between the crop state data and agricultural characteristic data or between multiple sets of crop state data. In some embodiments, analyzing received data at 306 includes a block 310 indicating that the controller 102 compares one or more predetermined relationships between crop state data and agricultural characteristic data (stored, for example, in the one or more memories 106) to the received crop state data and received agricultural characteristic data. In some embodiments, analyzing received data at 306 includes a block 312 indicating that the controller 102 applies mathematical equations or other predetermined rules (stored, for example, in the one or more memories 106) to the received crop state data, the received agricultural characteristic data, or both. In some embodiments, analyzing received data at 306 may include a block 314 indicating that the controller 102 applies neural networks or other AI processing to the received crop state data, received agricultural characteristic data, or both. The controller 102 may perform any of 310, 312, 314 independently or in conjunction to analyze the received crop state data and received agricultural characteristic data.

A non-exhaustive list of exemplary relationships between crop state data, agricultural characteristic data, or both includes: lodging direction, lodging magnitude, or both related to wind direction, wind speed, wind amplification, or both at the time of a lodging event; lodging magnitude related to lodging resistance; lodging magnitude related to actual harvested crop yield; lodging crop health metric change at a time post-lodging event related to actual harvested crop yield; lodging magnitude related to crop characteristic; lodging magnitude related to chemical treatment; lodging magnitude related to pest population. A relationship may be determined for a georeferenced area equal to, less than, or greater than a worksite.

Referring again to the method 300, at 316, the controller 102 generates an annotation based on the determined relationship between the received crop state data and the received agricultural characteristic data. At 336, the controller 104 causes the annotation to be displayed. For example, the annotation may be provided to a user via the display 105 of the user interface 104 or via a separate display 107. In some embodiments, the display 105 of the user interface 104 or the separate display 107 may be located in the operator's cab 16, and, in other embodiments, the display 105 of the user interface 104 or the separate display 107 may be located elsewhere on or away from the agricultural machine 10. Thus, a user viewing the display 105 or the display 107 may be located on the agricultural machine 10 (for example, at a worksite during an agricultural operation) or at a remote location away from the agricultural machine 10.

Referring still to FIG. 3, an annotation includes at least one of an alert, an explanation, a prediction, a recommendation, and a prescription, each of which may be generated by the controller 102, as shown at 326, 328, 330, 332, 334. Annotations may take the form of at least the following: a sound or speech; haptic indications, such as a vibration; map attributes, such as color, pattern, or shading; text on or external to a map; and one or more icons on or external to a map. As shown at 336, the controller 102 causes the display 105 of the user interface 104 or the separate display 107 to display the generated annotation. In some examples, the controller 102 may cause more than one annotation to be displayed simultaneously.

In some examples, the controller 102 may generate an annotation that is overlaid on a map. The combined output (e.g., including the map and the annotation) is referred to as an annotated map. The controller 102 causes the display 105 of the user interface 104 or the separate display 107 to display the annotated map. In some embodiments, the controller 102 may update the annotated map such that the annotated map continuously represents different regions of a worksite or multiple worksites. For example, the controller 102 may update the annotated map to continuously display a portion of the worksite in which the agricultural machine 10 or another work machine is located as the agricultural machine 10 or other work machine moves through the worksite.

As shown in FIG. 3, at 326, the controller 102 generates an alert. In one example, an alert is a type of annotation, which is intended to draw the attention of a user. In some examples, an alert may be an announcement or other indication provided to a user and intended to make the user aware of an annotation. An alert may take many forms including a chime, beep or other finite sound, a vibration or other haptic, a flashing display or other display, and speech. An alert may be provided to a user, for example via the display 105 of the user interface 104 or the separate display 107. In some instances, the alert is generated by the controller 102. In some examples, alerts may be provided to the user via the speaker of the user interface 104. The alert may be provided to the user during an agricultural operation or at any other time during or after a growing season. An illustrative alert 402 is shown in FIG. 4. In the example shown in FIG. 4, the alert 402 is provided to a user via speech, for example, by the speaker of the user interface 104.

As described above (and shown in FIG. 3 at 328), an explanation is another type of annotation that is generated by the controller 102. An explanation provides one or more reasons for the occurrence of the received crop state data, agricultural characteristic data, or both. In some embodiments, an explanation provides one or more reasons associated with an alert. An explanation may be provided to a user, for example via the display 105 of the user interface 104 or the separate display 107. In some instances, the alert is generated by the controller 102. In some examples, explanations may be provided to the user via the speaker of the user interface 104. The explanation may be provided to the user during an agricultural operation or at any other time during or after a growing season. In the example shown in FIG. 4, a follow-up explanation 404 is provided by the controller 102. In this example, first the controller 102 generates the alert 402. Subsequently, the controller 102 receives an indication of user input (e.g., via the microphone or display 105 of the user interface 104) that the controller 102 interprets as a request for an explanation 404 regarding the alert 402. The controller 102 generates the explanation 404 that provides one or more reasons for the alert 402 in response to the received indication of user input.

Figure 5:
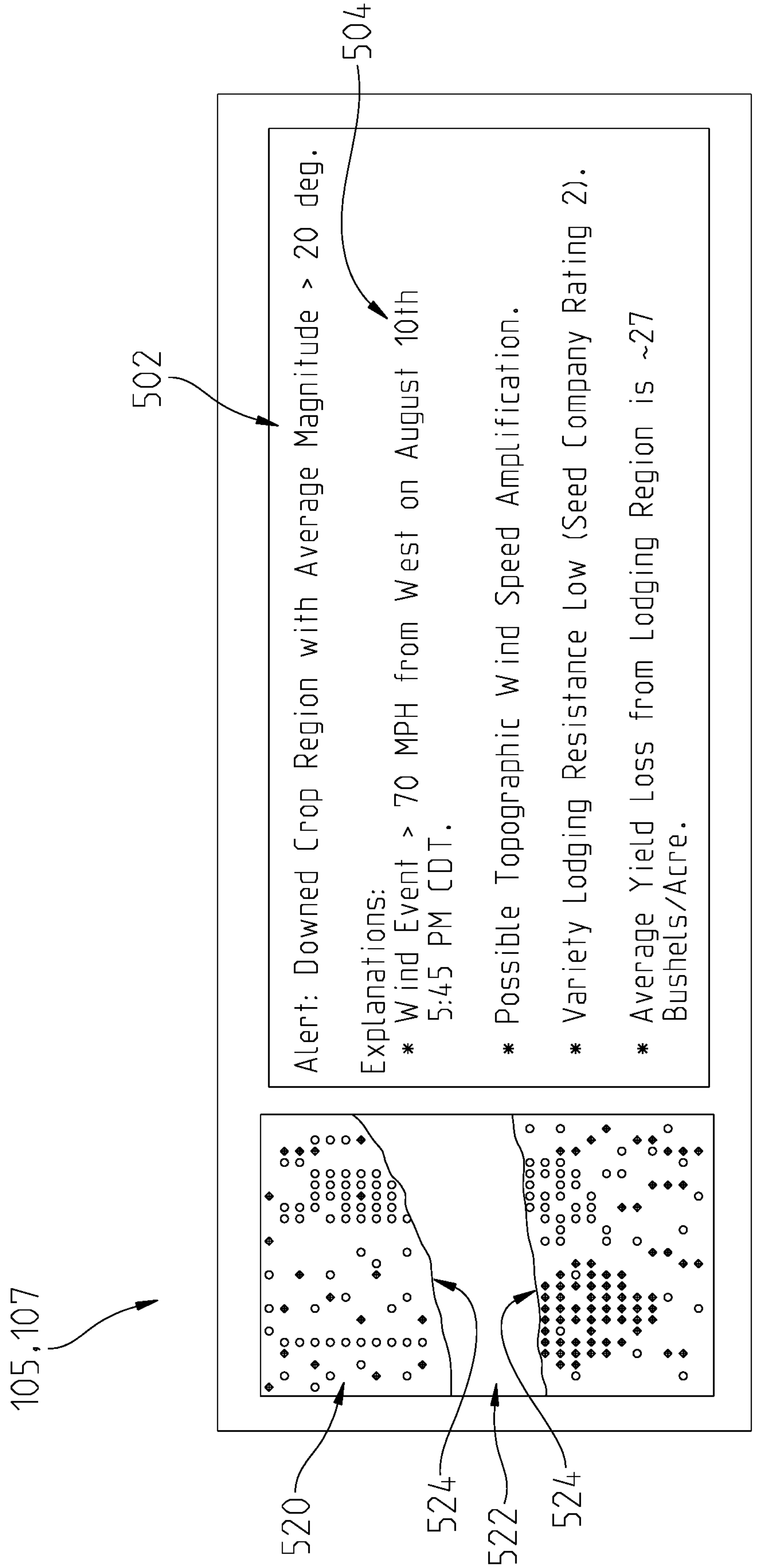
FIG. 5 is an example output that can be provided to a display showing a map and annotations, the annotations including an alert and an explanation that are generated based on agronomy data.

FIG. 5 is an example of a display (e.g., 105, 107) showing a yield map 520, an alert 502, and an explanation 504. The yield map 520 includes a lodged crop region 522 enclosed by a border 524. In some embodiments, the border 524 may be included as part of the alert 502. For example, the border 524 may be flashing or may include a color intended to draw the attention of a user. In this example, the alert 502 is based on georeferenced crop state data received by the controller 102 including lodging direction and lodging magnitude. Regarding the explanation 504, in this example, the controller 102 generates a wind event explanation based on the received crop state data and received agricultural characteristic data, including wind speed data (e.g., Doppler radar data). In this example, the controller 102 also generates a topographic wind speed amplification explanation based on the received crop state data and received agricultural characteristic data, including topographic data and wind direction. To analyze the data, the controller 102 applies a model or rule (e.g., a crop lodging model or rule), which is, for example, stored on the one or more memories 106. In this example, the controller 102 also generates a variety lodging resistance explanation based on the received crop state data and received agricultural characteristic data, including crop variety data. In this example, the controller 102 also generates an average yield loss explanation for the area enclosed by the border 524 based on the received crop state data. In this example, the received crop state data includes the actual or predicted harvesting yield for an area of the worksite or other worksites outside the lodged crop region 522.

Figure 6:
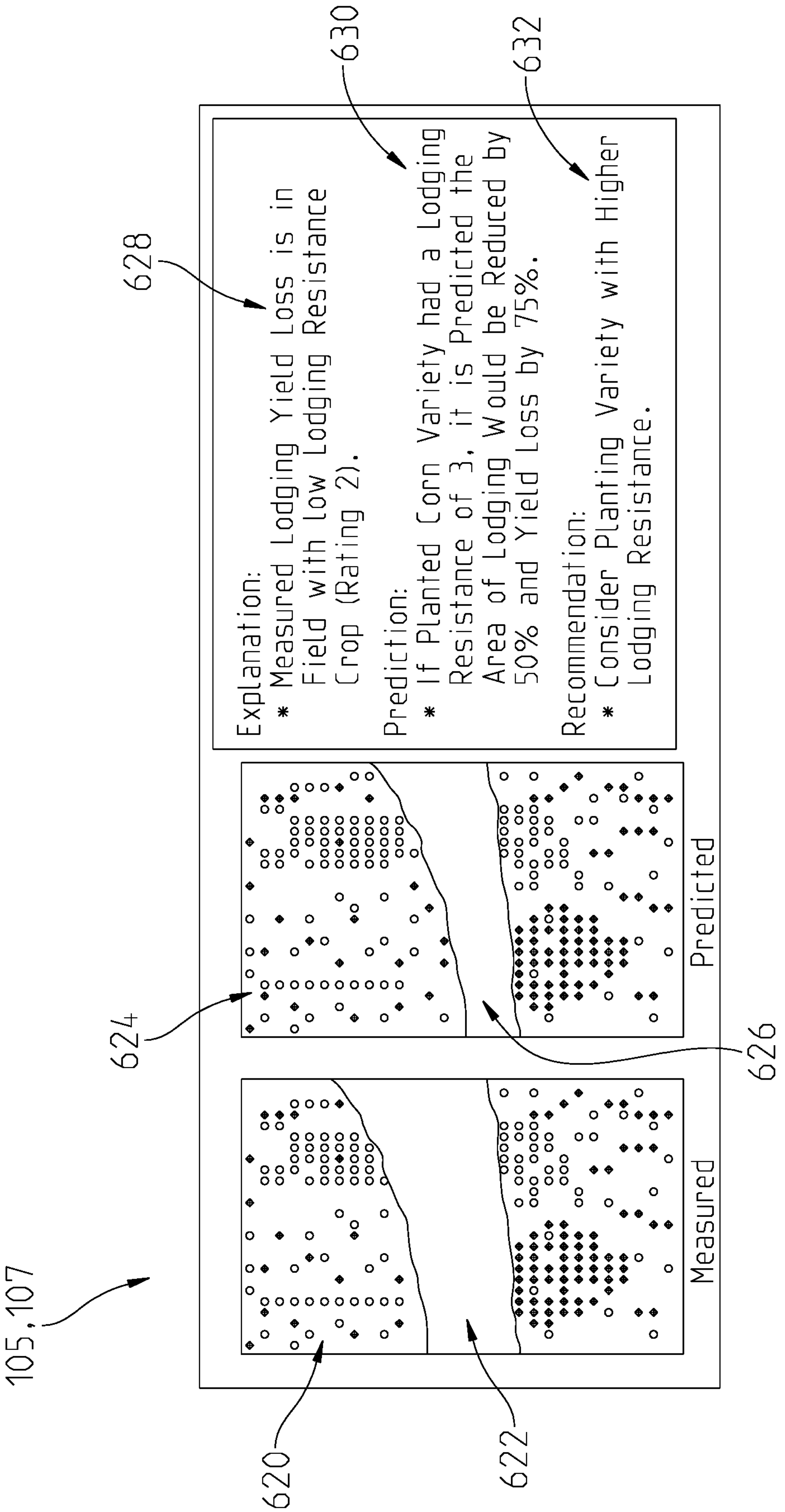
FIG. 6 is an example output that can be provided to a display showing maps and annotations, the annotations including an explanation, a prediction, and a recommendation that are generated based on agronomy data.

As described above (and shown in FIG. 3 at 330 and 332), predictions and recommendations are other types of annotations that are generated by the controller 102. A prediction is an annotation describing how received crop state data could have been or could in the future be changed based on one or more changes to agricultural characteristic data. A recommendation is a non-quantitative instruction regarding agricultural characteristic data (e.g., level the ground, apply less fertilizer, plant a higher lodging resistance variety crop). A recommendation is an indefinite instruction. Predictions and recommendations may be provided to a user, for example, via the display 105 of the user interface 104 or the separate display 107. In some instances, predictions and recommendations are generated by the controller 102. In some examples, predictions and recommendations may be provided to the user via the speaker of the user interface 104. Predictions and recommendations may be provided to the user during an agricultural operation or at any other time during or after a growing season. FIG. 6 is an example of a display (e.g., 105, 107) showing an actual yield map 620, a lodged crop region 622, a predicted yield map 624, and a predicted lodged crop region 626. The display (e.g., 105, 107) also shows an example of an explanation 628, a prediction 630, and a recommendation 632.

As described above (and shown in FIG. 3 at 334), a prescription is another type of annotation that may be generated by the controller 102. A prescription is a quantitative, georeferenced, or type-specific instruction regarding agricultural characteristic data (e.g., apply 20% less fertilizer than prior year, plant crop with lodging resistance of 3). A prescription is a definite instruction to be carried out by the agricultural machine 10, another agricultural machine, or a human. A non-exhaustive list of exemplary prescriptions for a worksite or portion thereof includes: planting a specified crop variety with a given lodging resistance; planting along a specified row direction (e.g., degrees relative to north); planting seed with a specified population or at a specified rate; applying a specified chemical at a specified rate (e.g., to mitigate pests that weaken plant stems or stalks, making the plants more vulnerable to lodging); irrigating or providing soil nutrients at a specified time or rate (e.g., to prevent overweighting of plant heads relative to plant stems); and levelling topography to a specified grade.

Figure 7:
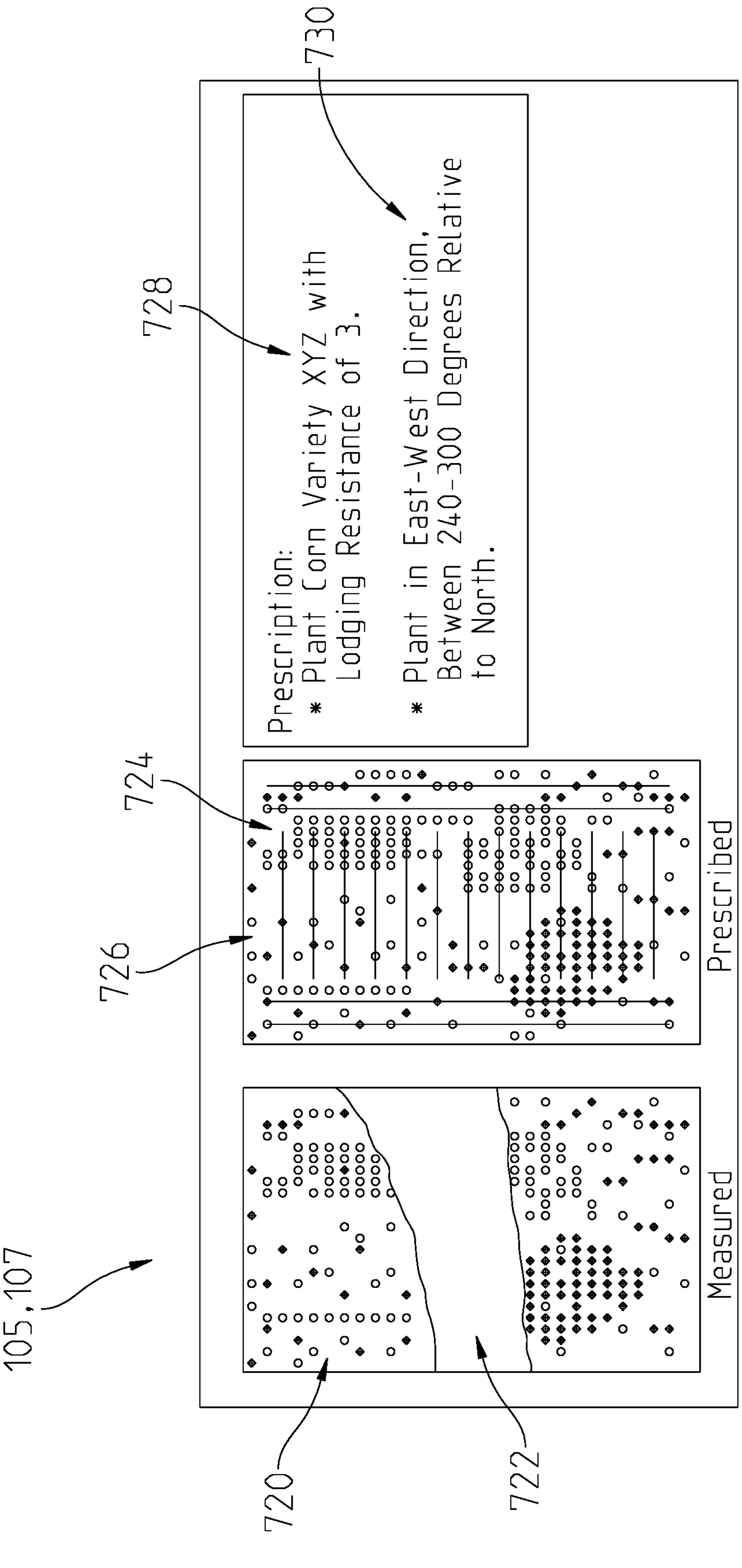
FIG. 7 is an example output that can be provided to a display showing maps and annotations, the annotations including prescriptions that are generated based on agronomy data.

As suggested by FIG. 7, prescriptions may be provided to a user, for example, via the display 105 of the user interface 104 or the separate display 107. In some instances, prescriptions are generated by the controller 102. In some examples, prescriptions may be provided to the user via the speaker of the user interface 104. The prescriptions may be provided to the user during an agricultural operation or at any other time during or after a growing season. FIG. 7 is an example of a display (e.g., 105, 107) showing an actual yield map 720 with a lodged crop region 722. The display (e.g., 105, 107) also shows an example of a first prescription 726 overlaid on a map 724. In some embodiments, the map 724 may indicate a prior year yield, seed rate, topology, soil type, or other agronomy data. The display 700 also shows a second prescription 730, including text associated with the first prescription 726, and a third prescription 728 separate from the first and second prescriptions 726, 730. In some embodiments, a prescription may be generated by the controller 102 in a machine readable format. For example, the controller 102 may generate a mission plan for the agricultural machine 10 or another agricultural machine. The mission plan may include, for example, a path of the agricultural machine 10 or another agricultural machine through a worksite, a seeding rate for a planting operation, fertilizer quantity, concentration for a fertilizing operation, or a combination of these.

Figure 8:
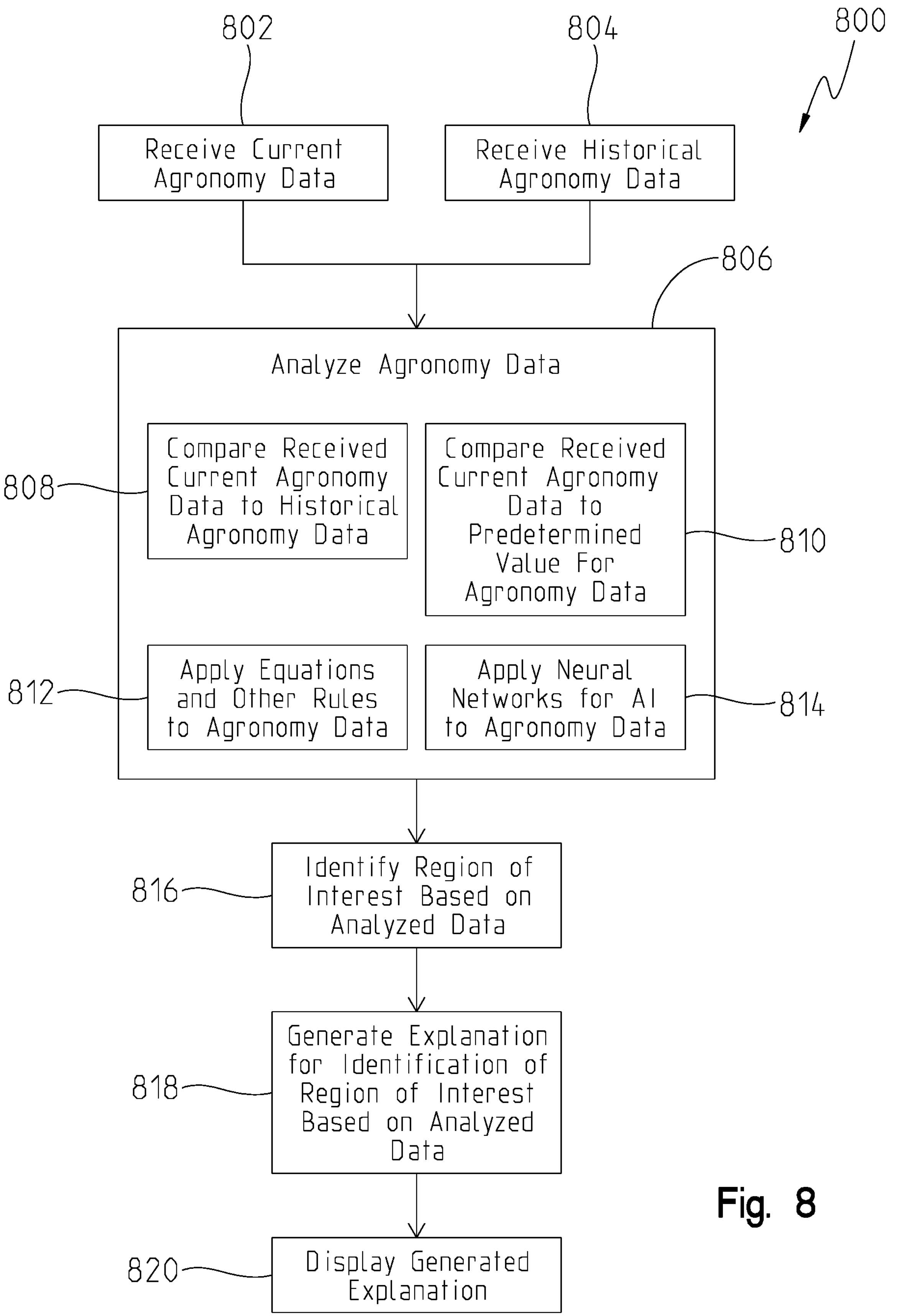
FIG. 8 is a flow diagram of an example method of generating an explanation for an identified region of interest using agronomy data.

Referring now to FIG. 8, an example method 800 of generating an explanation is shown. At 802, the controller 102 receives current agronomy data associated with a worksite. In some embodiments, at 804, the controller 102 receives historical agronomy data associated with the worksite. In some embodiments, 804 is omitted. For example, historical agronomy data may be previously provided to the one or more memories 106 (e.g., at a time prior to operation of the control system 200) and need not be received by the controller 102. At 806, the controller 102 analyzes the received current agronomy data, historical agronomy data, or both. In one example, block 806 may include determining one or more relationships between the received current agronomy data and the historical agronomy data. In another example, block 806 may include determining one or more relationships between the received current agronomy data and a predetermined value for agronomy data. The relationships may be at least one of a causation relationship and correlation relationship. A predetermined value is a value that is determined prior to operation of the control system 200. For example, a predetermined value for agronomy data may be stored on the one or more memories 106 prior to operation of the control system 200.

In some embodiments, analyzing agronomy data includes a block 808 indicating that the controller 102 compares received current agronomy data to historical agronomy data to determine whether the received current agronomy data are outside an acceptable range for agronomy data determined based on the historical agronomy data. For example, the acceptable range for agronomy data may be within 10% of the historical agronomy data.

In some embodiments, analyzing agronomy data includes a block 810 indicating that the controller 102 compares received current agronomy data to a predetermined value for agronomy data to determine whether the received current agronomy data are outside an acceptable range for agronomy data. In some examples, the acceptable range for agronomy data is based on the predetermined value for agronomy data. For example, the acceptable range for agronomy data may be within 10% of the predetermined value for agronomy data.

In some embodiments, analyzing agronomy data includes a block 812 indicating that the controller 102 applies mathematical equations or other rules stored in the one or memories 106 to the received current agronomy data, historical agronomy data, or both. In some examples, analyzing agronomy data includes a block 814 indicating that the controller 102 applies neural networks or other AI processing to the received current agronomy data, the historical agronomy data, or both. The controller 102 may perform any of 808, 810, 812, 814 independently or together to analyze the agronomy data.

At step 816, in one example, the controller 102 identifies a region of interest within the worksite based on the determined relationship between the historical agronomy data and the received current agronomy data. In another example, the controller 102 identifies a region of interest within the worksite based on the determined relationship between the received current agronomy data and the predetermined value for agronomy data. It should be appreciated that the region of interested may be determined based on other determined relationships between the analyzed agronomy data as well.

At step 818, in one example, the controller 102 generates one or more explanations for the identification of the region of interest based on the determined relationship between the received current agronomy data and the historical agronomy data, and, in another example, the controller 102 generates one or more explanations for the identification of the region of interest based on the determined relationship between the received current agronomy data and the predetermined value for agronomy data. Thus, in the illustrative embodiment, an explanation provides one or more reasons for identification of the region of interest. As shown at step 820, the controller 102 causes the display 105 of the user interface 104 or the separate display 107 to display the generated explanation.

The explanation may be provided to the user during an agricultural operation or at any other time during or after a growing season.

Figure 9:
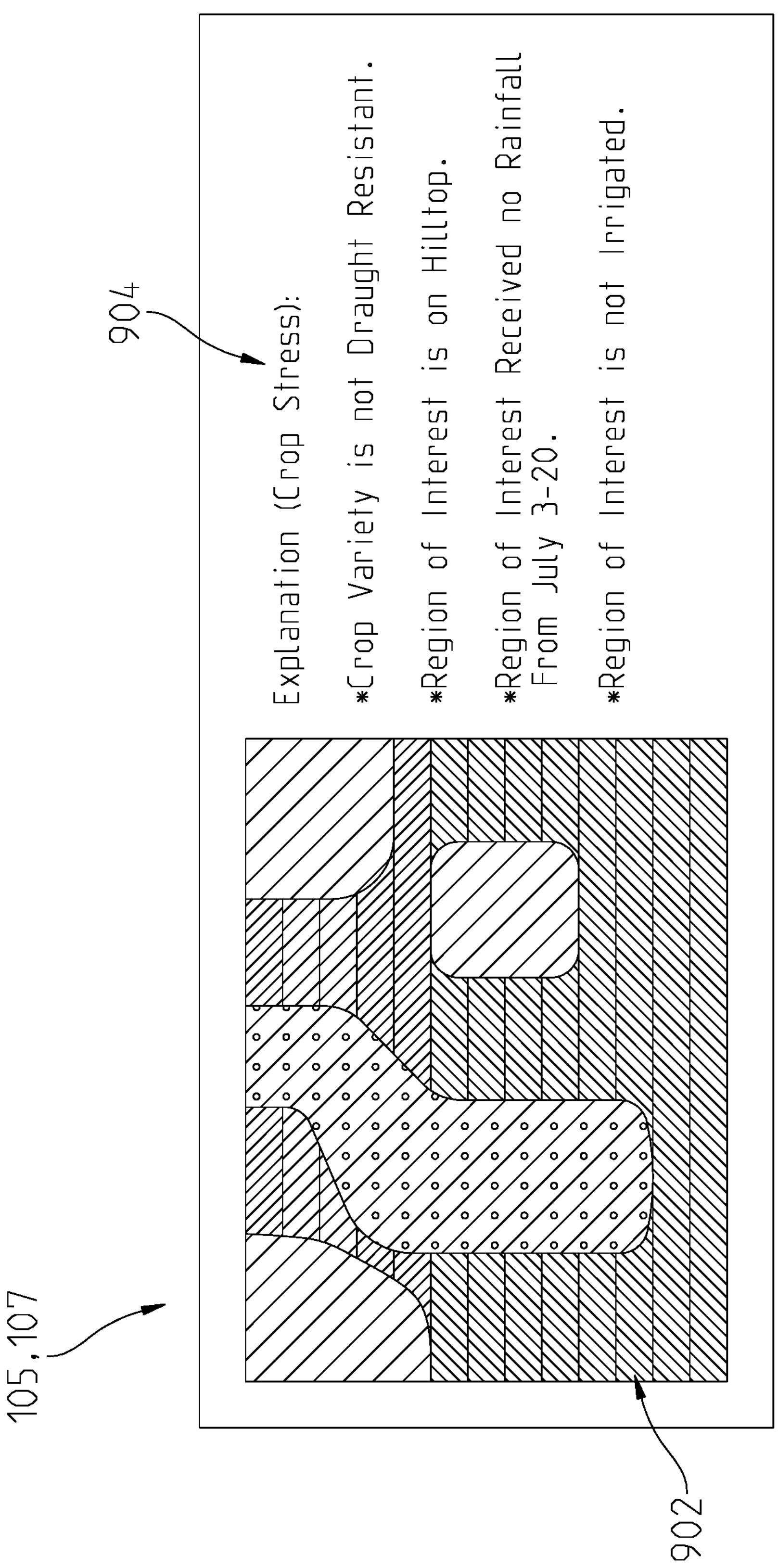
FIG. 9 is an example output that can be provided to a display showing a map with a region of interest, indicating areas of stressed crop, and an explanation for the region of interest.

FIG. 9 is an example of an explanation for stressed crop. FIG. 9 shows a map 902 that may be displayed on a display (e.g., 105, 107). The map 902 includes an NDVI background pattern, a topography pattern, and stressed crop shapes, which here are shown as circles. In other examples, colors, patterns, and shapes may be interchanged to depict relevant features of the map 902. In this example, the current agronomy data are an NDVI image; the historical agronomy data are crop variety (e.g., corn variety), topography, and rainfall; and the region of interest, depicted by circles, is identified by the controller 102 based on analysis of the georeferenced NDVI image (which is an example of received current agronomy data) in view of a predetermined NDVI value (which is an example of a predetermined value for agronomy data). In this example, the NDVI image shows that crops in the region of interest have NDVI values below the predetermined NDVI value. The display (e.g., 105, 107) shows an explanation 904, which is based on the received current agronomy data analyzed in view of historical agronomy data that includes crop variety, topography, and rainfall data.

Figure 10:
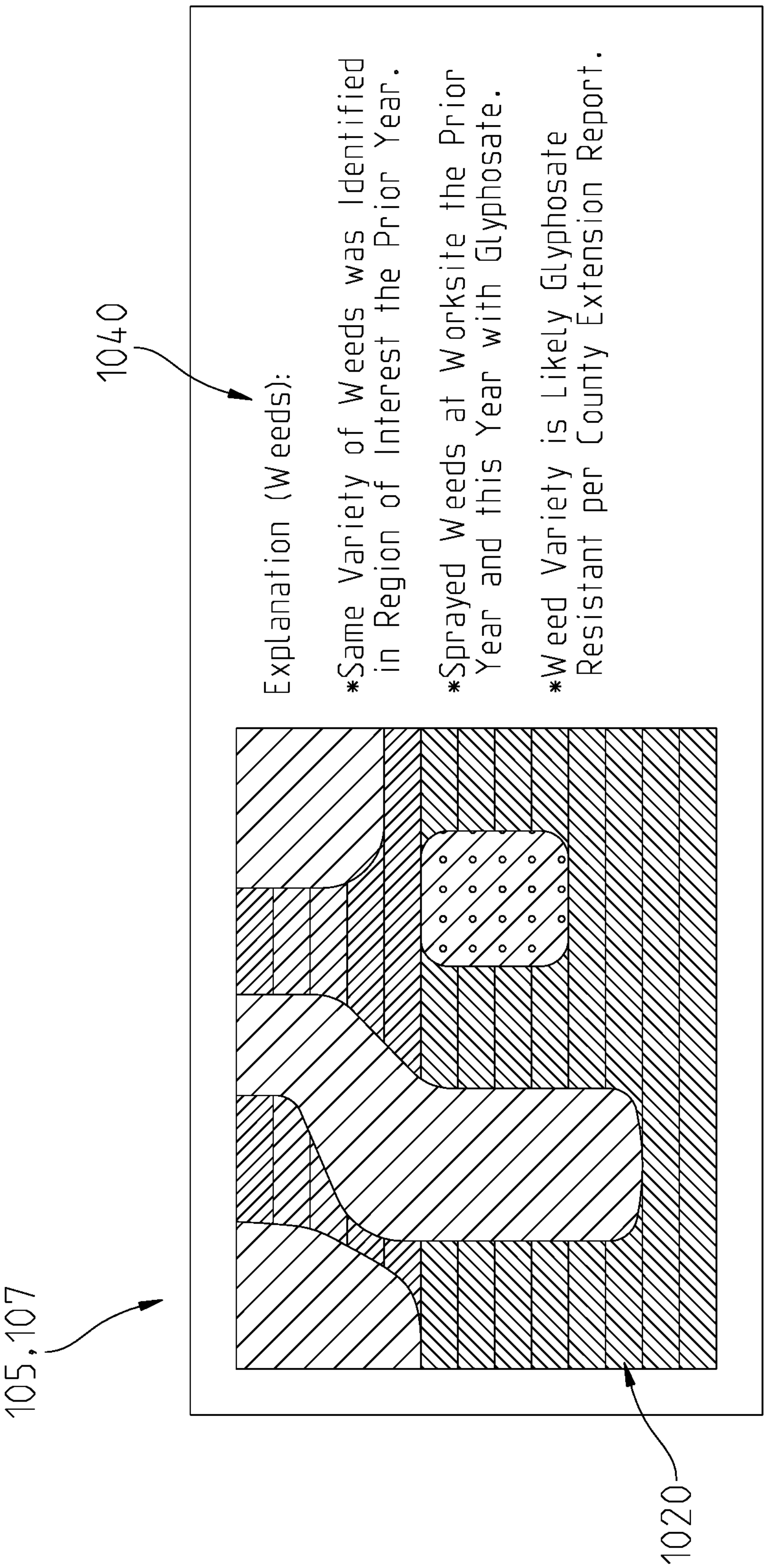
FIG. 10 is an example output that can be provided to a display showing a map with a region of interest, indicating areas of weeds, and an explanation for the region of interest.

FIG. 10 is an example of an explanation for weeds. FIG. 10 shows a display (e.g., 105, 107) showing a map 1020 that includes an NDVI background pattern, weed patches shown as widely space diagonal lines, and annually occurring weed patches shown with circles. In other examples, colors, patterns, and shapes may be interchanged to depict relevant features of the map 1020. In this example, the received current agronomy data are an NDVI image. The historical agronomy data are planted crop seed locations, prior season weed map, prior and current season weed treatment data, and county extension weed herbicide resistance information. The region of interest is depicted by circles and is identified by the controller 102 based on analysis of the georeferenced NDVI image (which is an example of received current agronomy data) in view of planted seed locations and prior season weed map (which are examples of historical agronomy data). The display (e.g., 105, 107) shows an explanation 1040 that is based on the received current agronomy data analyzed in view of the historical agronomy data that includes planted seed locations, prior season weed map, prior and current season weed treatment data, and county extension weed herbicide resistance information.

Figure 11:
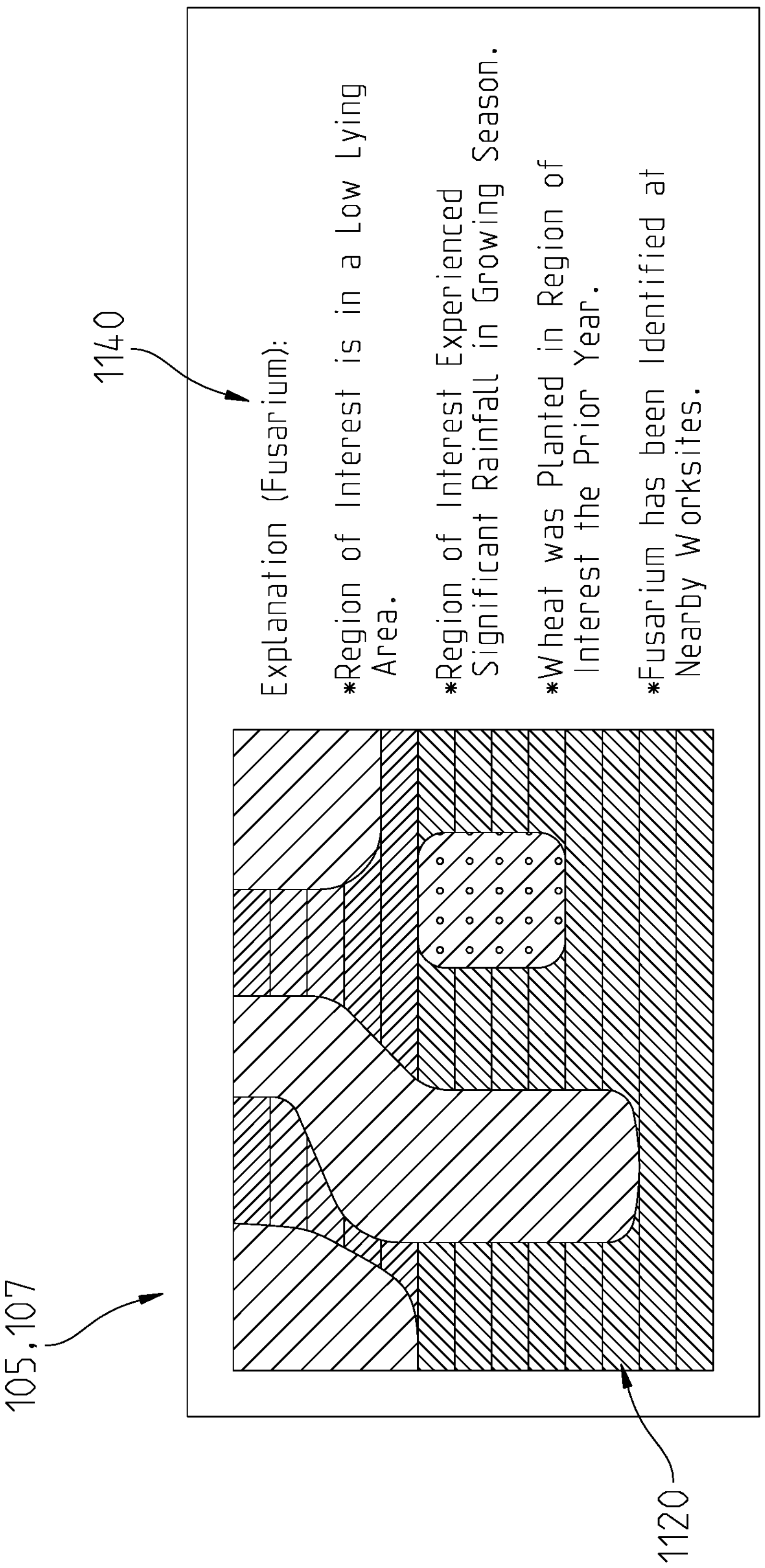
FIG. 11 is an example output that can be provided to a display showing a map with a region of interest, including areas of Fusarium, and an explanation for the region of interest.

FIG. 11 is an example of a display (e.g., 105, 107) showing a map 1120 that includes an NDVI background pattern, a topography pattern, and stressed crop overlay shapes. In this example, the stressed crop overlay shapes are in the form of circles. In other examples, colors, patterns, and shapes may be interchanged to depict relevant features of the map 1120. In this example, the received current agronomy data are an NDVI image or images from an in-situ, aerial, or fixed sensor; the historical agronomy data are topography, rainfall, prior year crop, history of occurrences of Fusarium, and crop reports in from other worksites; and the region of interest is depicted by circles. The region of interested is identified by the controller 102 based on analysis of the georeferenced NDVI image or the georeferenced images from the in-situ, aerial, or fixed sensor in view the historical agronomy data listed above. The display (e.g., 105, 107) shows an explanation 1140 that is based on received current agronomy data analyzed in view of historical agronomy data that includes topography, rainfall, prior year crop, history of occurrences of Fusarium, and crop reports in from other worksites.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present disclosure as defined by the appended claims.

The invention claimed is:

1. A method of generating an annotation for a map of a worksite, the method comprising:

receiving georeferenced crop state data for at least a portion of the worksite, the georeferenced crop state data comprising a crop state data;

receiving georeferenced agricultural characteristic data, the georeferenced agricultural characteristic data comprising an agricultural characteristic data;

analyzing received georeferenced crop state data and received georeferenced agricultural characteristic data to determine a causation relationship between the crop state data from the received georeferenced crop state data and the agricultural characteristic data from the received georeferenced agricultural characteristic data;

generating a georeferenced annotation based on the determined causation relationship between the crop state data and the agricultural characteristic data; and generating, by a controller, a machine readable instruction for a performance of an agricultural operation by an agricultural machine based on a prescription, the prescription being determined by the controller using the causation relationship.

2. The method of claim 1, further comprising:

displaying the generated georeferenced annotation on a display.

3. The method of claim 2, further comprising:

generating a map including at least a portion of the worksite based on at least one of the received georeferenced crop state data and the received georeferenced agricultural characteristic data; and displaying the generated map on the display simultaneously with displaying the generated georeferenced annotation on the display.

4. The method of claim 3, wherein displaying the generated map on the display simultaneously with displaying the generated georeferenced annotation on the display includes overlaying the generated georeferenced annotation on the generated map.

5. The method of claim 1, wherein the georeferenced crop state data comprises at least one of lodging direction, lodging magnitude, a lodging crop health metric, predicted harvest yield, and actual harvest yield.

6. The method of claim 5, wherein the georeferenced crop state data comprises at least one of lodging direction and lodging magnitude.

7. The method of claim 5, wherein the georeferenced crop state data comprises at least the lodging crop health metric.

8. The method of claim 1, wherein the georeferenced agricultural characteristic data comprises at least one of topography, soil characteristics, crop characteristics, pest characteristics, management characteristics, and weather characteristics.

9. The method of claim 1, wherein the georeferenced agricultural characteristic data comprises wind data.

10. The method of claim 9, wherein the georeferenced agricultural characteristic data further comprises lodging resistance of crop variety.

11. The method of claim 1, wherein the georeferenced agricultural characteristic data comprises agricultural characteristic data for at least a portion of the worksite.

12. The method of claim 1, wherein the georeferenced agricultural characteristic data comprises agricultural characteristic data for an area outside the worksite.

13. The method of claim 1, wherein the georeferenced annotation comprises at least one of an alert, an explanation, a prediction, a recommendation, and the prescription.

14. The method of claim 1, wherein the georeferenced annotation comprises at least a prediction.

15. The method of claim 1, wherein the georeferenced annotation comprises at least one of a recommendation and the prescription.

16. A method of generating an annotation for a map of a worksite, the method comprising:

receiving a first type of georeferenced agronomy data for at least a portion of the worksite;

receiving a second type of georeferenced agronomy data for at least the portion of the worksite;

analyzing the received first type of georeferenced agronomy data and the received second type of georeferenced agronomy data to determine a causation relationship between the received first type of georeferenced agronomy data and the received second type of georeferenced agronomy data;

generating a georeferenced annotation based on the determined causation relationship between the received first type of georeferenced agronomy data and the received second type of georeferenced agronomy data; and generating, by a controller, a machine readable instruction for a performance of an agricultural operation by an agricultural machine based on a prescription, the prescription being determined by the controller using the causation relationship.

17. The method of claim 16, wherein the received first type of georeferenced agronomy data comprises at least one of lodging direction, lodging magnitude, and a lodging crop health metric, and wherein the received second type of georeferenced agronomy data comprises at least one of predicted harvest yield and actual harvest yield.

18. The method of claim 17, wherein the georeferenced annotation comprises at least one of an alert, an explanation, a prediction, a recommendation, and a prescription.

19. A method of generating an annotation for a map of a worksite, comprising:

receiving georeferenced crop state data for at least a portion of the worksite;

receiving georeferenced agricultural characteristic data;

analyzing the received georeferenced crop state data and the received georeferenced agricultural characteristic data to determine a causation relationship between the georeferenced crop state data and the received georeferenced agricultural characteristic data;

generating a georeferenced annotation based on the determined causation relationship between the received georeferenced crop state data and the received georeferenced agricultural characteristic data, the georeferenced annotation comprising at least one of an alert, an explanation, a prediction, a recommendation, and a prescription;

generating a map including at least a portion of the worksite based on at least one of the received georeferenced crop state data and the received georeferenced agricultural characteristic data;

displaying the map on the display;

displaying the georeferenced annotation on the display while displaying the map on the display; and generating, by a controller, a machine readable instruction for a performance of an agricultural operation by an agricultural machine based on the prescription.

20. The method of claim 19, wherein the georeferenced agricultural characteristic data comprises at least one of topography, wind amplification, soil characteristics, crop characteristics, pest characteristics, management characteristics, and weather characteristics, and wherein the georeferenced crop state data comprises at least one of lodging direction, lodging magnitude, a lodging crop health metric, predicted harvest yield, and actual harvest yield.

21. The method of claim 1, wherein the crop state data comprises a first historical agronomy data that was collected prior to a current crop growing season.

22. The method of claim 21, wherein the agricultural state data is a second historical agronomy data.

23. The method of claim 1, further comprising comparing the causation relationship to a predetermined relationship, the predetermined relationship being a relationship between a stored crop state data and a stored agricultural state data.

* * * * *